(12) United States Patent
Matsunaga (10) Patent No.: US 9,489,579 B2
(45) Date of Patent: Nov. 8, 2016

(54) MONITORING DEVICE AND MONITORING METHOD

(71) Applicant: OMRON Corporation, Kyoto (JP)

(72) Inventor: Jumpei Matsunaga, Kusatsu (JP)

(73) Assignee: OMRON Corporation, Kyoto (JP)

( * ) Notice: Subject to any disclaimer, the term of this patent is extended or adjusted under 35 U.S.C. 154(b) by 116 days.

(21) Appl. No.: 14/518,578

(22) Filed: Oct. 20, 2014

(65) Prior Publication Data

US 2015/0131856 A1    May 14, 2015

(30) Foreign Application Priority Data

Nov. 14, 2013 (JP) .................................. 2013-235780

(51) Int. Cl.
*G06K 9/00* (2006.01)
*F16P 3/14* (2006.01)

(52) U.S. Cl.
CPC .......... *G06K 9/00771* (2013.01); *F16P 3/142* (2013.01); *G06K 9/00375* (2013.01)

(58) Field of Classification Search
USPC ........................................................ 382/103
See application file for complete search history.

(56) References Cited

U.S. PATENT DOCUMENTS

| 5,164,707 A | 11/1992 | Rasmussen et al. |
| 6,995,665 B2* | 2/2006 | Appelt ................ G08B 21/182 128/204.23 |
| 2003/0234347 A1 | 12/2003 | Akagi |
| 2005/0114154 A1* | 5/2005 | Wolkowicz ............ G06Q 30/02 340/539.12 |
| 2011/0007950 A1 | 1/2011 | Deutsch |
| 2011/0288659 A1 | 11/2011 | Nelson et al. |

FOREIGN PATENT DOCUMENTS

| JP | 2003-272061 A | 9/2003 |
| WO | 2011/123741 A2 | 10/2011 |

* cited by examiner

*Primary Examiner* — Yon Couso
(74) *Attorney, Agent, or Firm* — Nutter McClennen & Fish LLP; John J. Penny, Jr.; Santiago Velez (57) ABSTRACT

A monitoring device configured to monitor whether a look of a target person is in a proper state suitable for a working environment, and comprising: an image input unit configured to input an image of the target person; a detector configured to analyze the image input by the image input unit and detect a predetermined region of a human body of the target person; a state estimator configured to estimate a state of the predetermined region detected by the detector; a proper state acquisition unit configured to acquire proper state information on a proper state of the predetermined region according to the working environment; and a controller configured to determine whether a present state of the predetermined region of the target person is proper by comparing an estimation result of the state estimator to the proper state information, and perform control according to a determination result.

13 Claims, 9 Drawing Sheets

| Working environment and working content | Glove to be used | Features of glove ||
|---|---|---|---|
| | | Color | Wearing range |
| Chemical handling | Chemical resistant rubber glove | Blue | Whole ranges of both hands |

| Working area | Working environment and content | Glove to be used | Features of glove | | |
|---|---|---|---|---|---|
| | | | Color | Thickness level (thin: 1 to thick: 3) | Wearing range |
| A | Handling of sharp component | Blade resistant glove | Red | 3 | Whole ranges of both hands |
| B | Chemical handling | Chemical resistant rubber glove | Blue | 2 | Whole ranges of both hands |
| C | Quality check of product | Finger cot | Yellow | 1 | All fingers of hands |

FIG. 9

MONITORING DEVICE AND MONITORING METHOD

CROSS-REFERENCE TO RELATED APPLICATION

This application is based on Japanese Patent Application No. 2013-235780 filed with the Japan Patent Office on Nov. 14, 2013, the entire contents of which are incorporated herein by reference.

FIELD

The present invention relates to a technology of monitoring whether a look of a worker is proper.

BACKGROUND

In a factory or a working site, sometimes a worker is required to wear proper clothes according to a working environment or a working content. For example, a protective tool, such as gloves and a goggle, which should be worn by the worker, is defined in order to secure safety of the worker to prevent a work accident in the site where a dangerous article is handled, or frequently the worker wears dedicated gloves at a request of sanitary control in a food producing line or a medical front.

Nowadays, observance of a rule concerning a look (such as clothes and wearing of the protective tool) during the work relies on monitoring of visual inspection such as an instruction and attention of a manager, self-check of the worker, and cross-check among workers. Therefore, there is a risk that the worker starts the dangerous work while the worker is not aware that he has forgotten to wear the gloves or other workers do not recognize that the worker forgets to wear the gloves. Habituation of the work degrades the perception of the danger, or possibly the worker may ignore the rule, and perform the work in the improper look.

In the field of FA (Factory Automation) or the like, a monitoring device that detects invasion or access of the worker with an optical sensor to secure the safety of the worker is put to practical use (for example, see JP 2003-272061 A). However, in this kind of monitoring device, although the invasion in a dangerous zone and the access to a dangerous article can be detected, whether the look of the worker is proper, namely, for example, whether the worker wears the gloves cannot be determined. Even if the work is dangerous, there is no problem when the look of the worker is in a state suitable for the work. However, the monitoring processing cannot be performed by a conventional device.

The dangerous work is described above by way of example. Even if the work is not associated with danger, sometimes the proper clothes are defined from the viewpoint of sanitary control or work efficiency, and there is also demand for simply monitoring whether the look of the worker is proper in such working sites.

SUMMARY

In accordance with an aspect of an embodiment of the present disclosure, there is provided a monitoring device configured to monitor whether a look of a target person is in a proper state suitable for a working environment or a working content, the monitoring device comprising: an image input unit configured to input an image of the target person; a detector configured to analyze the image input by the image input unit and detect a predetermined region of a human body of the target person; a state estimator configured to estimate a state of the predetermined region detected by the detector; a proper state acquisition unit configured to acquire proper state information, the proper state information expressing a proper state of the predetermined region according to the working environment or the working content; and a controller configured to determine whether a present state of the predetermined region of the target person is proper by comparing an estimation result of the state estimator to the proper state information, and perform control according to a determination result.

In accordance with another aspect of an embodiment of the present disclosure, there is provided a monitoring method for monitoring whether a look of a target person is in a proper state suitable for a working environment or a working content, the monitoring method comprising: a step in which a computer inputs an image of the target person; a step in which the computer analyzes the input image to detect a predetermined region of a human body of the target person; a step in which the computer estimates a state of the predetermined region detected by the computer; a step in which the computer acquires proper state information, the proper state information expressing a proper state of the predetermined region according to the working environment or the working content; and a step in which the computer determines whether a present state of the predetermined region of the target person is proper by comparing a result of the state estimation of the computer to the proper state information, and performs control according to a determination result.

DETAILED DESCRIPTION

An object of an embodiment of the invention is to provide a technology of automatically monitoring whether the look of the worker is proper according to the working environment or the working content.

In order to achieve the above object, the embodiment of the invention is configured to automatically determine whether a present look of a target person to be monitored is in a proper state suitable for the working environment or the working content using an image of the target person.

Hereinafter, an exemplary embodiment of the invention will be described with reference to the drawings. In the following embodiments, by way of example, the invention is applied to a system that automatically monitors whether a worker wears predetermined gloves in order to avoid a danger (to secure safe and health) in a factory and the like.

First Embodiment

System Configuration

Figure 1:
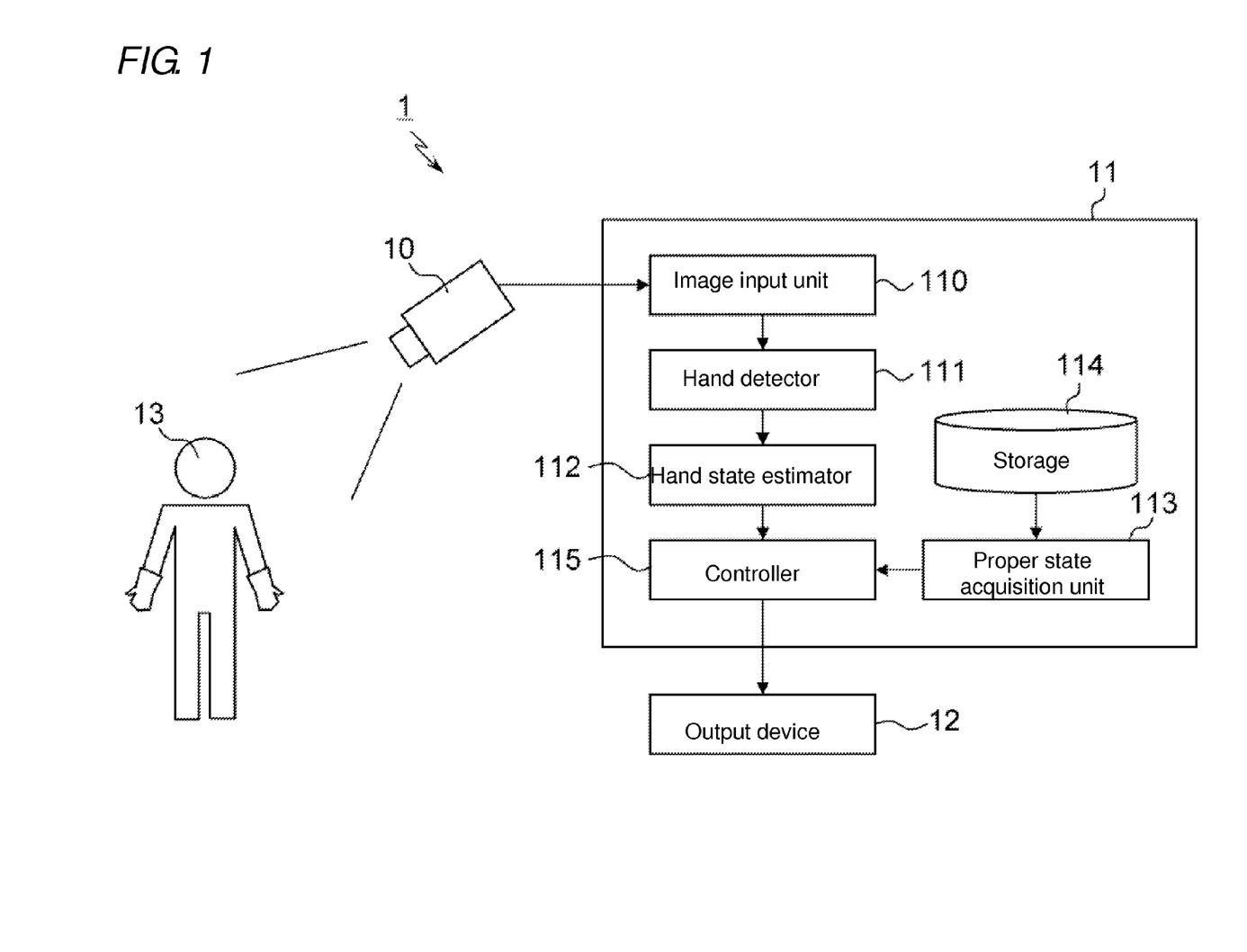
FIG. 1 is a view schematically illustrating a configuration of a monitoring system according to a first embodiment.

FIG. 1 is a view schematically illustrating a configuration of a monitoring system according to a first embodiment of the invention. A monitoring system 1 of the first embodiment is installed at an entrance gate of the factory or in a clean room, and used to check whether the worker who is willing to enter the factory or the clean room correctly wears the predetermined gloves.

As illustrated in FIG. 1, the monitoring system 1 includes a camera 10, a monitoring device 11, and an output device 12. A camera 10 is an imaging instrument that captures an image of a worker 13 to take the acquired image data in the monitoring device 11. Although one camera 10 is illustrated in FIG. 1, a plurality of cameras 10 may be installed as needed. This is because a blind spot is eliminated by capturing the image of the worker 13 in various directions. Using the image acquired from the camera 10, the monitoring device 11 determines whether the worker 13 correctly wears the predetermined gloves. The output device 12 outputs a determination result to the worker 13. For example, a display device that outputs the determination result through characters or images and a speaker that outputs sound or a warning tone can be used as the output device 12 in order to make a notification whether a look of the worker 13 is proper.

As illustrated in FIG. 1, the monitoring device 11 includes an image input unit 110, a hand detector 111, a hand state estimator 112, a proper state acquisition unit 113, a storage 114, and a controller 115 as functional elements. For example, the monitoring device 11 is constructed with a computer system including hardware resources such as a processor (CPU), a memory, an auxiliary storage device, an input device, and a communication interface. Each functional element in FIG. 1 is implemented by the processor executing a program. Alternatively, all or some of the functional elements may be constructed with a dedicated chip (logic circuit). The monitoring device 11 or the monitoring system 1 may be constructed with not one computer, but a combination of a plurality of computers or cloud computing.

The image input unit 110 is a function of taking in the image data from the camera 10. The taken-in image may be either a moving image or a still image. The hand detector 111 is a function of analyzing the taken-in image to detect a hand region (for example, a region from a wrist to a fingertip). Any technology is applied to hand detection processing. Examples of the hand detection processing include a method for detecting a face or a head from the image to identify the hand region from a relative position relationship based on a human body model and a method for recognizing a shape of a finger of the hand by pattern recognition or model fitting.

The hand state estimator 112 is a function of analyzing the image of the hand region to estimate whether the worker 13 is barehanded or is correctly wearing the gloves. Any technology is applied to hand state estimation processing. For example, color information extracted from the hand region is compared to color information extracted from a face region, a determination of "bare hands" may be made when the pieces of color information are similar to each other, and a determination of "gloves are worn" may be made when the pieces of color information are different from each other. Alternatively, the determination of "gloves are worn" may be made when a relative size of a finger to a size of the hand region is larger than or equal to a predetermined value, or a shape or a pattern of the glove may be recognized.

The hand state estimator 112 may estimate a feature (such as a color, a shape, and a thickness) or a wearing range (range covered with the glove) of the gloves to be worn. For example, the color of the glove can be estimated from the color information extracted from the hand region, and the shape of the glove can be estimated using pattern matching or shape analysis. The thickness of the glove can be estimated from the number of pixels in an end edge portion of the glove or a degree of wrinkle formed in a surface of the glove. The wearing range can be estimated from a color histogram of a pixel in the hand region. For example, the whole hand region is covered with the glove in the case that the pixels concentrate on a certain color region of the color histogram, the whole hand region is covered with the glove. On the other hand, in the case that a pixel distribution is observed even in a flesh-colored region of the color histogram, it can be estimated that the gloves are incorrectly worn to partially expose a bare skin.

Figure 2:
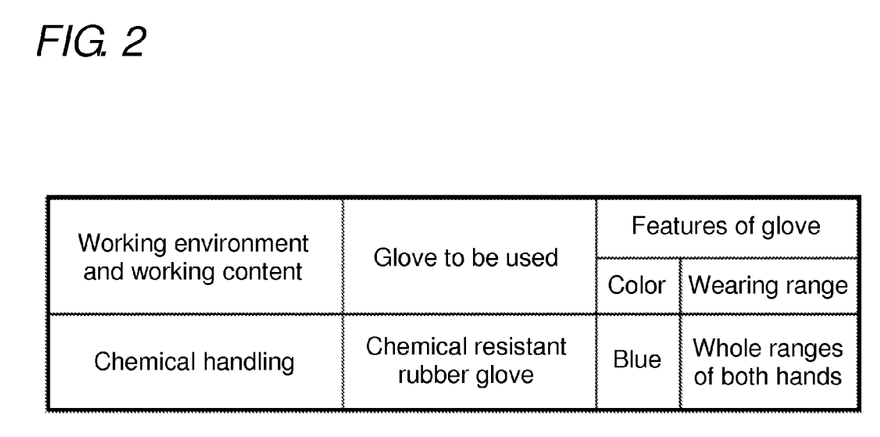
FIG. 2 is a view illustrating an example of a data structure of proper state information in the first embodiment.

The proper state acquisition unit 113 is a function of reading proper state information from the storage 114. The proper state information is information that defines a proper look (in the first embodiment, predetermined gloves are worn) for which the worker 13 is required. FIG. 2 is a view illustrating an example of a data structure of the proper state information set in the storage 114. In the proper state information, it is defined that the worker 13 is required to wear "chemical resistant rubber gloves" as a protector used to perform a working content that is of "chemical handling", that the color of the glove is "blue", and that the worker 13 necessarily wears the chemical resistant rubber gloves such that the "whole ranges of both the hands" are covered. The proper state information is preset by a user (system manager) during the installment of the monitoring system 1.

The controller 115 is a function of determining whether the hand state is proper by comparing an estimation result of the hand state estimator 112 to the proper state information read by the proper state acquisition unit 113. The controller 115 also has a function of generating a control signal according to a determination result, and transmitting the control signal to the output device 12 to control the output device 12.

Monitoring Processing

Figure 3:
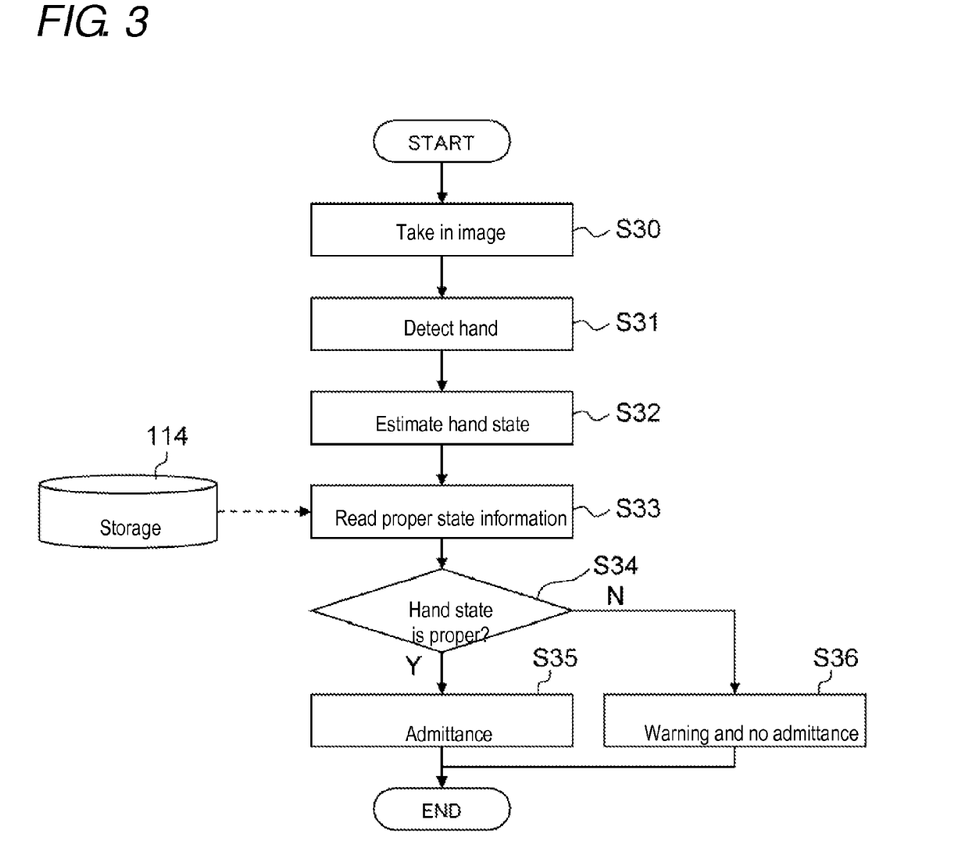
FIG. 3 is a flowchart illustrating a flow of monitoring processing in the first embodiment.

FIG. 3 is a flowchart illustrating a flow of monitoring processing in the monitoring system 1 of the first embodiment. For example, when the monitoring system 1 detects that the worker 13 comes to the entrance gate by human detection in which a human sensor or the image of the camera 10 is used, the monitoring device 11 starts the monitoring processing in FIG. 3.

The image input unit 110 takes in the image of the worker 13 from the camera 10 (Step S30). The hand detector 111 detects the hand region of the worker 13 from the image (Step S31). When the hand detector 111 fails to detect the hand region, the subsequent processing performed to the image may be skipped, or the image may be taken in again (Step S30). The hand state estimator 112 analyzes the image of the hand region detected in Step S31, and determines whether the worker 13 wears the gloves or is barehanded. When determining that worker 13 wears the gloves, the hand state estimator 112 estimates the color and the wearing range of the glove (Step S32). The proper state acquisition unit 113 reads the proper state information in FIG. 2 from the storage 114 (Step S33).

The controller 115 acquires the proper state information from the proper state acquisition unit 113 while acquiring the estimation result of the hand state estimator 112. The controller 115 evaluates whether the present hand state of the worker 13 estimated by the hand state estimator 112 satisfies the proper hand state defined by the proper state information (Step S34).

When the worker 13 wears the "blue" gloves in the "whole ranges of both hands", the controller 115 determines that the look of the worker 13 is proper (YES in Step S34), and outputs a message of admittance from the output device 12 (Step S35). On the other hand, when the worker 13 is "barehanded" or when the worker 13 wears gloves in different color or incorrectly wears the gloves even if the worker 13 wears the gloves, the controller 115 determines that the look of the worker 13 is improper (NO in Step S34), and outputs a message encouraging the worker 13 to wear the correct gloves from the output device 12 (Step S36). At this point, the controller 115 may close the entrance gate to prevent the entry of the worker 13 whose look is improper.

Advantage of First Embodiment

In the monitoring system 1 of the first embodiment, the hand state of the worker 13 estimated from the image can be compared to the proper state information to automatically determine whether the present look of the worker 13 is in the proper state suitable for the working environment or the working content. When the worker 13 incorrectly wears the predetermined gloves, the message encouraging the worker 13 to correctly wear the predetermined glove is generated or the entrance gate is closed, which allows the worker 13 in the improper look to be prevented from performing the work.

Additionally, in the monitoring system 1 of the first embodiment, the image is used, so that the state of the worker 13 can be monitored in a non-contact manner (furthermore, at some point distant from the worker 13). Therefore, the monitoring can continuously be performed without obstructing the work or behavior of the worker 13. In the monitoring system 1 of the first embodiment, because of high flexibility of installation, advantageously the monitoring system 1 can easily expand to various scenes and applications. In the first embodiment, because the proper state information is previously set in the storage 114, the function and processing of the proper state acquisition unit 113 can be simplified, and whether the worker 13 correctly wears the gloves can be accurately determined at high speed. Whether the worker 13 wears the proper gloves is determined by evaluating, for example the color consistency, so that the determination can be accurately made by the simple processing.

Second Embodiment

A monitoring system according to a second embodiment of the invention will be described below. In the monitoring system of the first embodiment, whether the worker wears the gloves is checked at such a place as the entrance gate. On the other hand, in the second embodiment, a plurality of areas that differ from each other in the working environment or the working content can be simultaneously monitored.

Figure 4:
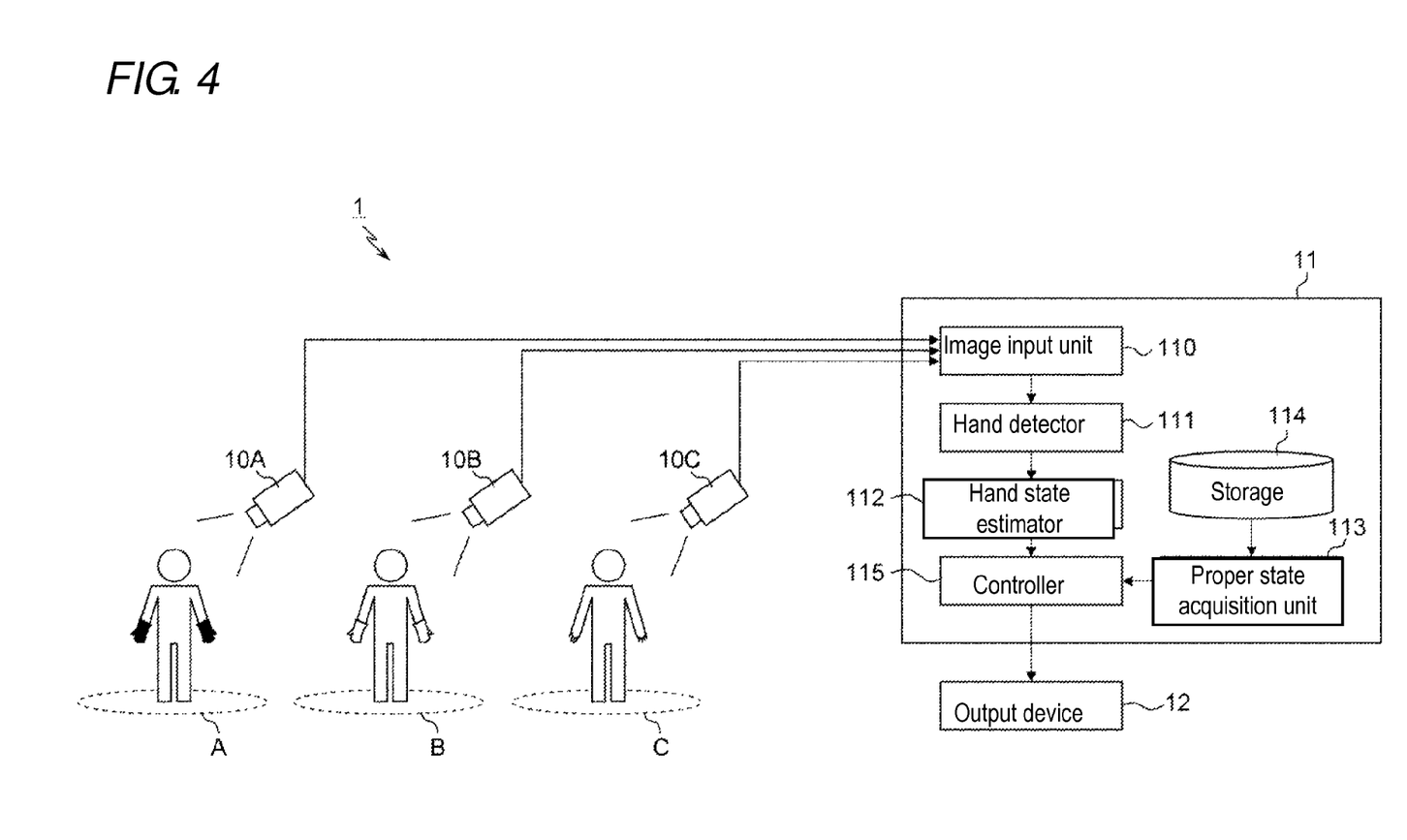
FIG. 4 is a view schematically illustrating a configuration of a monitoring system according to a second embodiment.

FIG. 4 is a view schematically illustrating a configuration of a monitoring system of the second embodiment and a monitoring area of the monitoring system. In the monitoring system of the second embodiment, the component identical to that of the first embodiment is designated by the identical numeral, and the description of the component is omitted.

In the monitoring system 1 of the second embodiment, three cameras 10A, 10B, and 10C are provided, the first camera 10A is installed so as to capture the image in a working area A, the second camera 10B is installed so as to capture the image in a working area B, and the third camera 10C is installed so as to capture the image in a working area C. It is assumed that the works of the different contents are performed in the working areas A to C, for example, it is assumed that "handling of a sharp component" is performed in the working area A, that "chemical handling" is performed in the working area B, and that "quality check of a product" is performed in the working area C. The worker engages in each work is required to wear a protective tool suitable for each working content. It is conceivable that the identical worker performs each work while moving among the working areas A to C. In such cases, it is necessary that the worker performs the work while changing the protective tool in each working area. The monitoring system 1 of the second embodiment has the configuration suitable for the state monitoring in an environment (multitask environment) in which different works are mixed.

Figure 5:
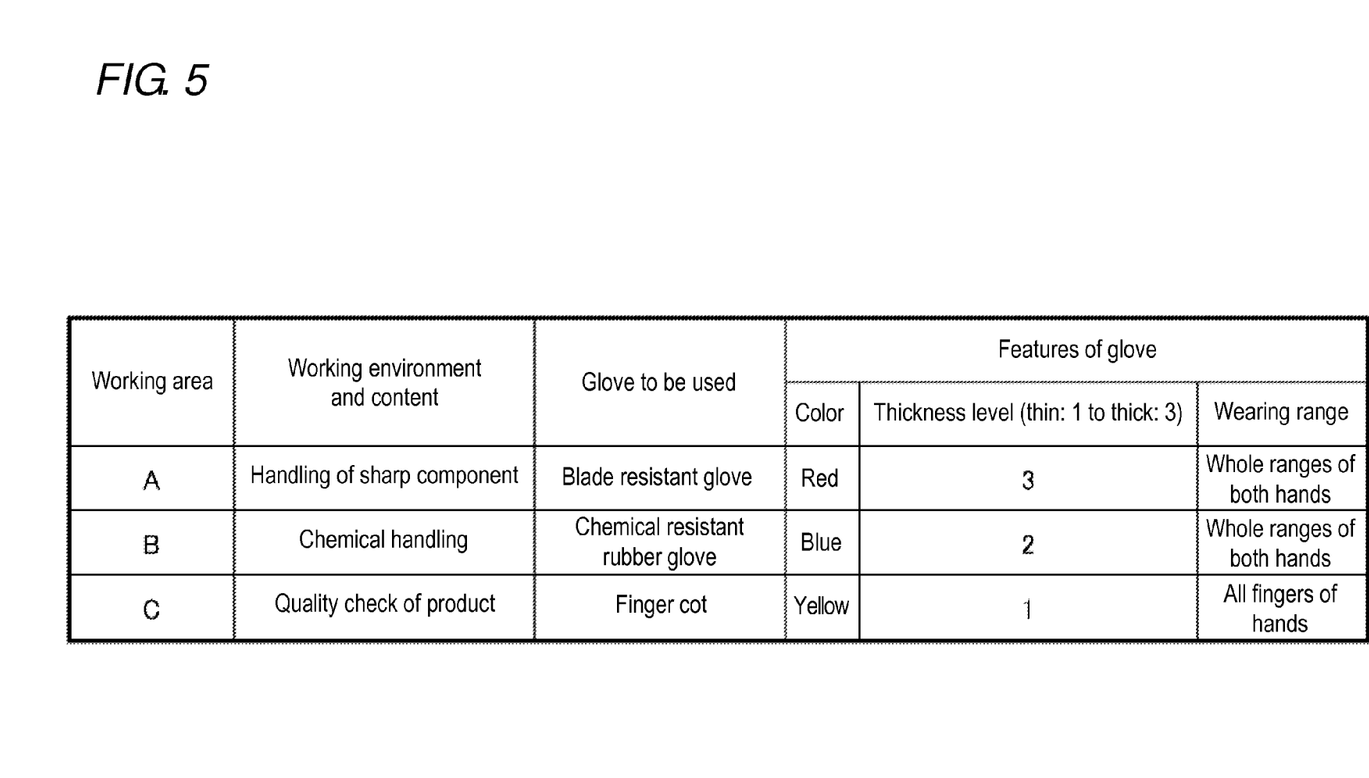
FIG. 5 is a view illustrating an example of a data structure of proper state information in the second embodiment.

FIG. 5 is a view illustrating an example of a data structure of proper state information set in the storage 114. In FIG. 5, a plurality of pieces of proper state information are set according to the working content or working environment in each working area. Specifically, in the proper state information on the working area A, for example, it is defined that the worker necessarily wears "blade resistant gloves" when performing the "handling of the sharp component", that the color of the glove is "red", that a thickness level is "3 (thick)", and that the worker necessarily wears the blade resistant gloves such that the "whole ranges of both the hands" are covered. In the proper state information on the working area B, it is defined that the worker necessarily wears the "chemical resistant rubber gloves" in order to perform the "chemical handling" work, that the color of the glove is "blue", that the thickness level is "2 (medium)", and that the worker necessarily wears the blade resistant gloves such that the "whole ranges of both the hands" are covered. In the proper state information on the working area C, it is defined that the worker necessarily wears "finger cots" in order to perform the "quality check of the product", that the color of the "finger cots" is "yellow", that the thickness level is "1 (thin)", and that the worker necessarily wears the "finger cots" in "all the fingers of both the hands".

Figure 6:
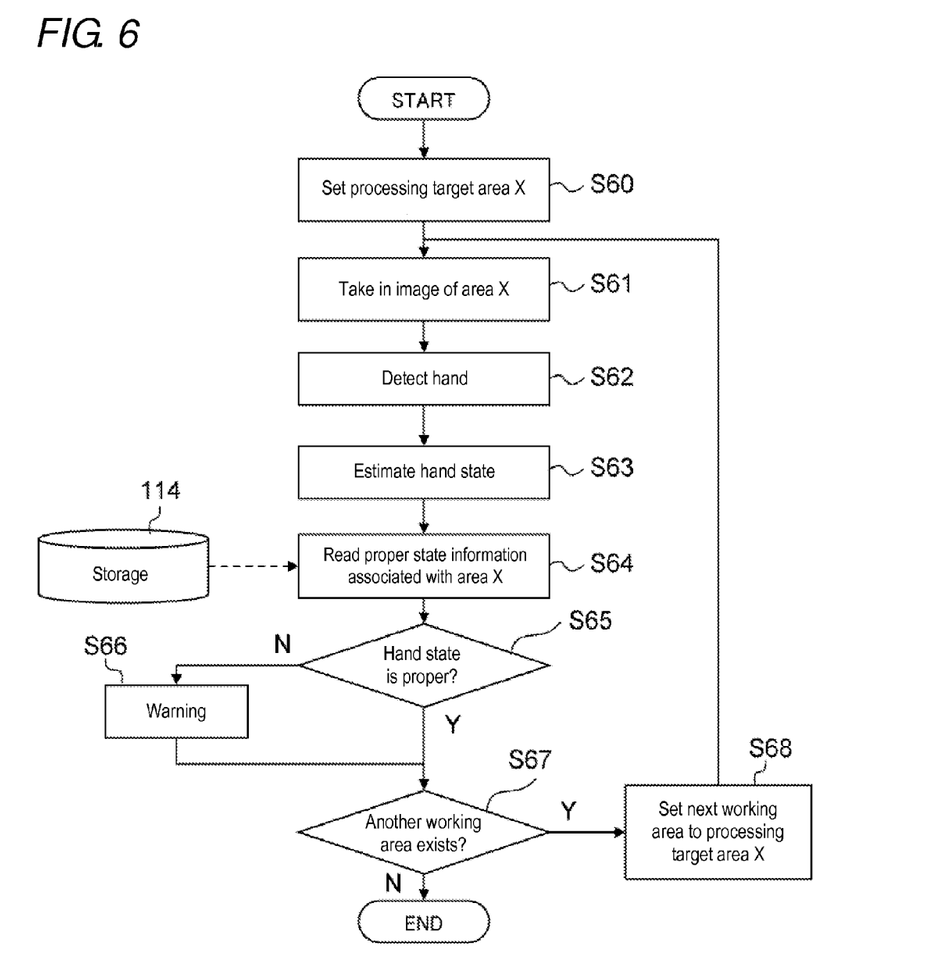
FIG. 6 is a flowchart illustrating a flow of monitoring processing in the second embodiment.

FIG. 6 is a flowchart illustrating a flow of monitoring processing in the monitoring system 1 of the second embodiment. It is assumed that the processing in FIG. 6 is repeatedly performed at predetermined intervals (for example, once every 0.1 seconds).

A working area A is set to a processing target area X (Step S60). The image input unit 110 takes in the image of the working area A from the first camera 10A installed in the working area A (Step S61). The hand detector 111 detects the worker and the hand region of the worker from the image (Step S62). In the case that the worker does not exist in the image or that the hand detector 111 fails to detect the hand region, the subsequent processing performed to the image is skipped. The hand state estimator 112 analyzes the image of the hand region detected in Step S61, and determines whether the worker wears the gloves or is the barehanded. When the hand state estimator 112 determines that worker wears the gloves, the hand state estimator 112 estimates the color, the thickness level, and the wearing range of the glove (Step S63). The proper state acquisition unit 113 reads the proper state information associated with the working area A from the storage 114 (Step S64).

The controller 115 acquires the proper state information on the working area A from the proper state acquisition unit 113 while acquiring the estimation result of the hand state estimator 112. The controller 115 evaluates whether the look (hand state) of the worker in the working area A estimated by the hand state estimator 112 satisfies the proper state defined by the proper state information (Step S64).

When the worker wears the "red" gloves having the thickness level "3" in the "whole ranges of both the hands", the controller 115 determines that the look of the worker is proper (YES in Step S65). On the other hand, when the worker is "barehanded" or when the worker wears gloves in different color or different thickness or incorrectly wears the gloves, the controller 115 determines that the look of the worker is improper (NO in Step S65), and outputs the message encouraging the worker to wear the correct gloves to the worker existing in the working area A (Step S66).

When another working area exists (YES in Step S67), the next working area (for example, the working area B) is set to the processing target area X (Step S68), and the similar processing is performed. That is, the image input unit 110 takes in the image of the working area B from the second camera 10B (Step S61), the hand detector 111 detects the hand region (Step S62), and the hand state estimator 112 estimates whether the worker wears the gloves, and the color, the thickness level, and the wearing range of the glove (Step S63). The proper state acquisition unit 113 reads the proper state information associated with the working area B from the storage 114 (Step S64). The controller 115 determines whether the look of the worker is proper by comparing the hand state of the worker existing in the working area B to the proper state information on the working area B (Step S65). When the look of the worker is improper, the controller 115 outputs the message encouraging the worker to wear the correct gloves to the worker existing in the working area B (Step S66).

The processing is ended after the similar processing is performed to the working area C (NO in Step S67). The one monitoring system 1 can simultaneously monitor the plurality of areas that differ from each other in the working environment or the working content by periodically repeating the pieces of processing in Steps S60 to S67.

In the monitoring system of the second embodiment, the advantageous effects similar to that of the monitoring system of the first embodiment can be obtained. Additionally, the proper state information is switched according to the working environment or the working content, so that the state monitoring can be properly performed according to each work even if the works differ from each other in the proper look. Whether the worker 13 wears the proper object is determined by evaluating the color consistency, so that the determination can be accurately made by the simple processing. In the site where the plurality of works are mixed like the second embodiment, a synergistic effect of thorough completion of the working rule and simplification of the monitoring processing can be expected when the monitoring system is associated with a working rule that the color of the glove varies in each work.

Third Embodiment

In the second embodiment, the camera is installed in each working area. On the other hand, in a third embodiment, the images of the plurality of working areas are captured by one camera, and the proper state information is switched based on which position the worker exists in the image.

Figure 7:
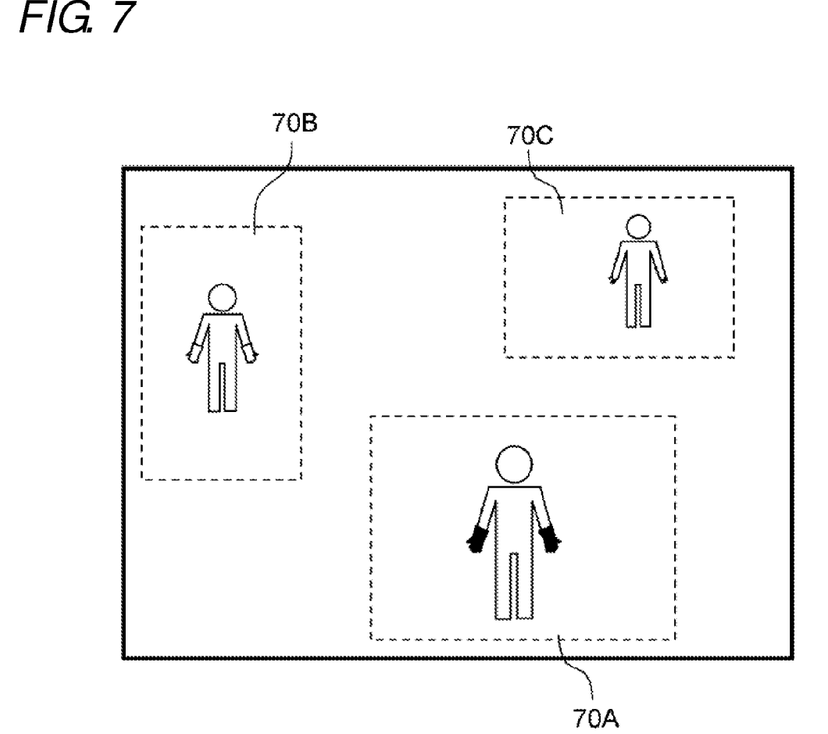
FIG. 7 is a view illustrating an example of an image used in a monitoring system according to a third embodiment.

FIG. 7 illustrates an example of the image taken from the camera 10. It is assumed that the image of the working area A is captured in a block 70A of the image, that the image of the working area B is captured in a block 70B, and that the image of the working area C is captured in a block 70C. The user (system manager) associates the block in the image with the working area (proper state information) in installation of the monitoring system 1.

Figure 8:
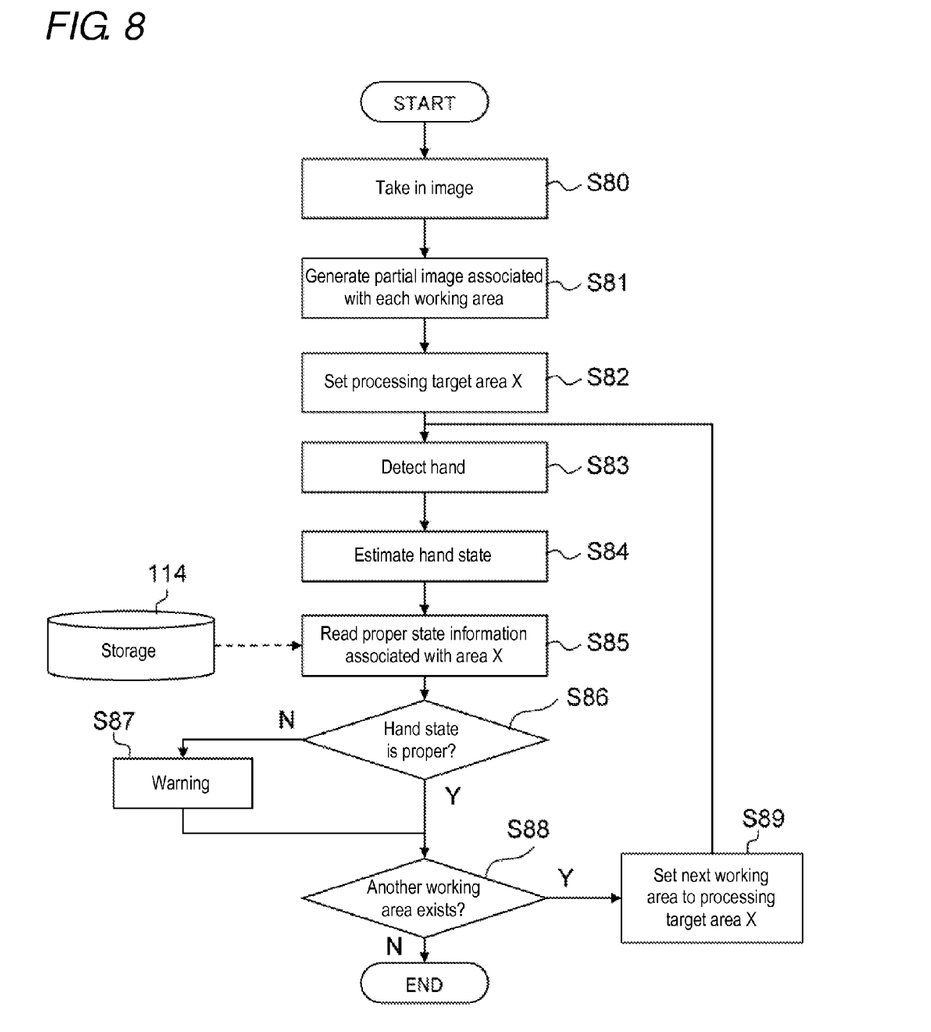
FIG. 8 is a flowchart illustrating a flow of monitoring processing in the third embodiment.

FIG. 8 is a flowchart illustrating a flow of monitoring processing in the monitoring system of the third embodiment. It is assumed that the processing in FIG. 8 is repeatedly performed at predetermined intervals (for example, once every 0.1 seconds).

The image input unit 110 takes in the image from the camera 10 (Step S80). The image input unit 110 divides the image to generate partial images associated with the working areas A, B, and C (Step S81). The processing similar to that of the second embodiment is performed to each partial image (pieces of processing in Steps S82 to S89 of FIG. 8 are identical to those in Steps S60, and S62 to S68 of FIG. 6). That is, the worker included in the partial image of the block 70A is checked against the proper state information on working area A (see FIG. 5), the worker included in the partial image of the block 70B is checked against the proper state information on working area B, and the worker included in the partial image of the block 70C is checked against the proper state information on working area C.

The configuration of the third embodiment can obtain the advantageous effects similar to that of the second embodiment.

Additionally, the number of cameras is decreased compared with the second embodiment, so that the configuration of the monitoring system can be simplified to reduce cost.

Fourth Embodiment

In the first to third embodiments, the preset proper state information is used. On the other hand, in a fourth embodiment, the monitoring system adaptively (dynamically) determines the proper look of the worker from the captured image. For example, in the case that the working environment or the working content can arbitrarily change, or in the case that there is a risk of accidentally or randomly generating a dangerous event, it is difficult to decide the proper state beforehand. However, the monitoring system can flexibly deal with a situation change when the working environment or the working content is adaptively determined.

Because the basic configuration of the monitoring system is substantially identical to the basic configurations of the first to third embodiments, the illustration will not be repeated. However, the monitoring system of the fourth embodiment differs from the monitoring systems of the first to third embodiments in that the proper state acquisition unit 113 has a function of estimating the working environment or the working content by image analysis and that the necessity to provide the storage 114 in which the proper state information is preset is eliminated. A unique configuration of the fourth embodiment will be mainly described below.

Figure 9:
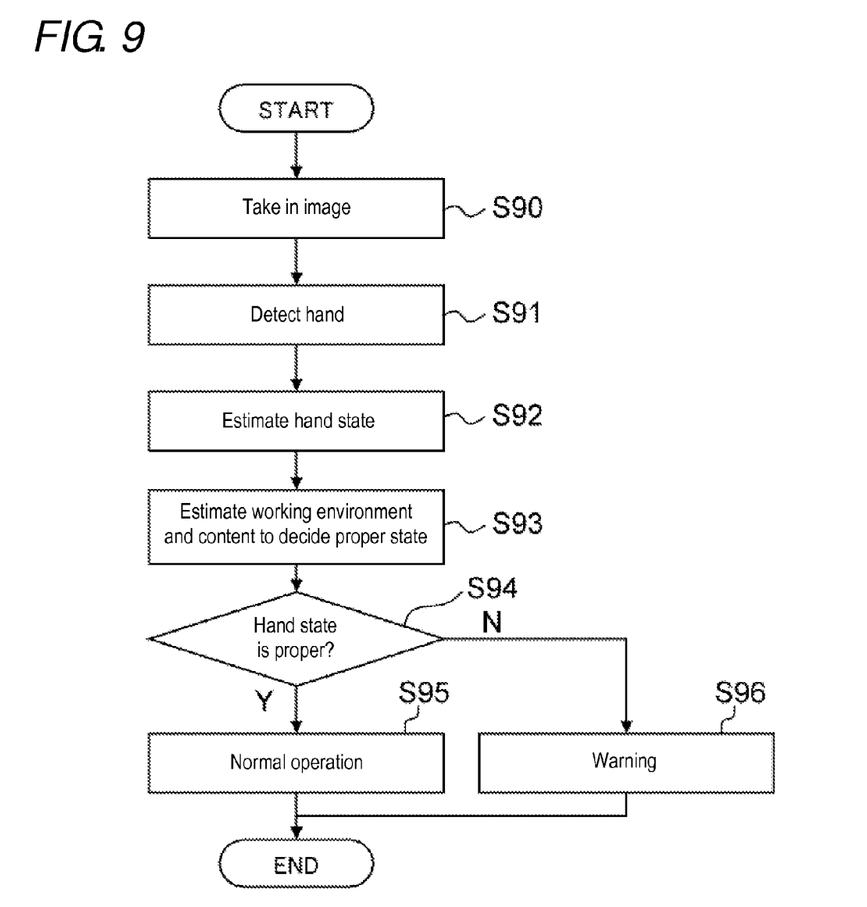
FIG. 9 is a flowchart illustrating a flow of monitoring processing in a fourth embodiment.

FIG. 9 is a flowchart illustrating a flow of monitoring processing in the monitoring system of the fourth embodiment. It is assumed that the processing in FIG. 9 is repeatedly performed at predetermined intervals (for example, once every 0.1 seconds).

The image input unit 110 takes in the image from the camera 10 (Step S90). The hand detector 111 detects the worker and the hand region of the worker from the image (Step S91).

In the case that the worker does not exist in the image or that the hand detector 111 fails to detect the hand region, the subsequent processing performed to the image is skipped. The hand state estimator 112 analyzes the image of the hand region detected in Step S91, and determines whether the worker wears the gloves or is barehanded. When determining that worker wears the gloves, the hand state estimator 112 estimates the color and the wearing range of the glove (Step S92).

The proper state acquisition unit 113 analyzes the image taken in Step S90, and estimates the working environment or the working content (Step S93). Any technology such as physical body recognition and scene recognition may be applied to the working environment estimation processing and the working content estimation processing. For example, a physical body existing around the worker is detected and recognized by the physical body recognition, and the work performed by the worker can be predicted by determining whether the physical body that is possibly handled (touched, carried, or operated) by hands exists near the worker. For example, in the case that a chemical container exists near the worker, it can be estimated that the worker probably performs the work having a risk of touching the chemical. In the case that foods exist in front of the worker, it can be estimated that the worker probably performs the work, such as food processing, in which sanitary control is required. Alternatively, the work performed by the worker and the working environment of the work can be predicted by detecting and recognizing clothes or equipment of the worker. For example, in the case that the worker wears rubber boots while wearing the protective tool such as a goggle, it can be estimated that some sort of protective tool is required for the hands of the worker. In the case that the worker does not wear some sort of protective tool, or in the case that the worker has the wide exposed portion of the skin, it can be estimated that the necessity to protect the hands is eliminated. As described above, by estimating the working environment or the working content from the physical body worn by the worker or the physical body existing around the worker, a behavior of the worker or a possible risk can be predicted with high accuracy for the purpose of inhibiting inappropriate action (for example, the worker touch the food with bare hands) or avoiding the risk. The proper state acquisition unit 113 decides the proper look of the worker based on the estimation result, and generates the proper state information.

Then the controller 115 acquires the proper state information from the proper state acquisition unit 113 while acquiring the estimation results of the hand state estimator 112. The controller 115 evaluates whether the look (for example hand state) of the worker estimated by the hand state estimator 112 satisfies the proper state (Step S94). The following pieces of processing are similar to those of the first to third embodiments.

The configuration of the fourth embodiment can obtain the advantageous effects similar to that of the first to third embodiments. Additionally, in the site where the working environment or the working content can arbitrarily change or there is the risk of accidentally or randomly generating the dangerous event, advantageously the monitoring processing can be flexibly performed according to the change in situation.

Other Embodiments

The above embodiments of the invention are described only by way of example. For example, the configurations of the first to fourth embodiments may be properly combined, or the following configurations may be used.

In the first to fourth embodiments, the hand state (the worker is barehanded or wears the gloves or the like) of the worker is monitored. Alternatively, whether the worker wears a proper object in another region of the human body of the worker may be monitored. For example, in the case that the worker handles a dangerous article or in the case that the worker performs the work in a dangerous zone, the worker is required to protect a head or eyes of the worker. In the case that the worker handles a sanitary control article such as the food, the worker is required to wear a mask or cap. Accordingly, the state of the head or a facial part (such as eyes, a nose, and a mouth) is estimated from the image, whether the worker wears the necessary object such as a helmet, a cap, a goggle, and a mask may be monitored. In the case that the improper object (such as earrings and a necklace) is detected during the work, a caution or a warning may be issued.

In the first to fourth embodiments, the output device 12 outputs the message in the case that the look of the worker is improper. However, there is no limitation to the control generated according to the determination result. For example, emergency stop of a machine is preferably performed for the purpose of the risk avoidance. For the purpose of process management or improvement, a site manager may be informed by electronic mail, or the determination result may be recorded in a log.

As described herein, according to a first aspect of an embodiment of the invention, a monitoring device configured to monitor whether a look of a target person is in a proper state suitable for a working environment or a working content, the monitoring device includes: an image input unit configured to input an image of the target person; a detector configured to analyze the image input by the image input unit and detect a predetermined region of a human body of the target person; a state estimator configured to estimate a state of the predetermined region detected by the detector; a storage unit for storing proper state information, the proper state information expressing a proper state of the predetermined region according to the working environment or the working content; a proper state acquisition unit configured to acquire the proper state information from the storage unit, the proper state information expressing a proper state of the predetermined region according to the working environment or the working content; and a controller configured to determine whether a present state of the predetermined region of the target person is proper by comparing an estimation result of the state estimator to the proper state information, and perform control according to a determination result.

As used herein, the look of the target person includes an object (such as clothes and a protective tool) worn by the target person and a state that the object is worn by the target person. The target (range) monitored by the monitoring device may be the whole human body (all the regions) or a part (one or a plurality of regions) of the human body. Various things, for example, the target person wearing the gloves or finger cots, the target person wearing long-sleeved clothes or pantaloons, the target person wearing a predetermined coat or a protective suit, the target person wearing a helmet or a cap on a head, the target person wearing safety shoes or boots, or the target person wearing a safety belt on a waist, can become the monitoring target. The state of the predetermined region of the human body means a state concerning the object worn on the predetermined region (for example, whether the object is worn, what kind of the object is worn, or whether the object is worn in a correct manner).

The working environment means a state of a scene around the target person or the predetermined region of the target person. In a place different from a usual environment, the target person is required to wear clothes or a protective tool according to the place. Examples of the place different from the usual environment include a dangerous article or a large-scale machine existing around the target person, a place with possibly-emitted harmful liquid or gas, unusual temperature, humidity, or pressure, and a clean room in which a cleaning state is continuously maintained. The working content means a content of the work performed by the target person. For example, to carry dangerous article or to operate large-scale machine, the target person is required to wear the protective tool for the purpose of safety. If the target person touches foods or works in a clean room, the target person is required to wear antibacterial or dust-resistant clothes.

Accordingly, in the configuration of the first aspect, whether the present look of the target person is in the proper state suitable for the working environment or the working content can be automatically determined by comparing the state of the target person estimated from the image to the proper state information. The target person can be properly prevented from performing the work by performing the control according to the determination result (for example, in the case that the look of the target person is improper, a warning is issued or the machine is stopped). Additionally, the image is used in the embodiment of the invention, so that the state of the target person can be monitored in a non-contact manner. Therefore, the monitoring can be continuously performed without obstructing the work or actions of the target person. Additionally, because of high flexibility of installation, advantageously the monitoring system can easily expand to various scenes and applications.

The proper state acquisition unit may be configured to read the proper state information to be compared to the estimation result of the state estimator from a storage in which the proper state information expressing the proper state of the predetermined region is previously set. That is, the state of the target person estimated from the image is compared to the preset proper state. The method has an advantage that the function and processing of the proper state acquisition unit can be simplified.

In the present method, preferably a plurality of pieces of proper state information can be set in the storage, and the proper state acquisition unit is configured to acquire the proper state information to be compared to the estimation result of the state estimator according to the working environment or the working content. Therefore, the monitoring processing corresponding to a plurality of working environments or working contents can be performed by one monitoring device.

There are methods for switching the proper state information according to the working environment or the working content. For example, in the case that the monitoring device is configured to monitor a plurality of areas that differ from each other in the working environment or the working content, the proper state acquisition unit can be configured to acquire the proper state information based on which area the target person or the predetermined region is located in. Alternatively, in the case that the working environment or the working content changes with time, the proper state acquisition unit can be configured to acquire the proper state information according to a present clock time, or acquire the proper state information by receiving a signal indicating that the working environment or the working content has changed. Accordingly, even if the proper look varies according to the work, the state can be properly monitored for each work.

The proper state acquisition unit may be configured to analyze the image input by the image input unit, estimate the working environment or the working content of the target person, and decide the proper state of the predetermined region based on the estimation result. That is, the proper look of the target person is adaptively (dynamically) determined from the captured image. For example, in the case that the working environment or the working content changes arbitrarily, or in the case that there is a risk of accidentally or randomly generating a dangerous event, it is difficult to preset the proper state. However, the change in situation can flexibly be dealt with in an adaptive system that estimates the working environment or the working content from the image.

In an example of the adaptive system, preferably the proper state acquisition unit is configured to recognize a physical body except the predetermined region of the target person or a physical body existing around the target person from the image input by the image input unit, and estimate the working environment or the working content of the target person based on a recognition result. By estimating the working environment or the working content from the physical body worn by the target person or the physical body existing around the target person, a behavior of the target person or a possible risk can be predicted with high accuracy for the purpose of inhibiting inappropriate action or avoiding the risk.

In the case that the predetermined region is a hand, the state estimator may be configured to estimate whether the target person correctly wears the object on the hand. Therefore, for example, the target person can be prevented from performing the work, in which the target person is required to wear the gloves, with bare hands or the target person can be prevented from performing the work, which should not be performed barehanded by the target person, but with the target person wearing the gloves. Preferably the state estimator may be configured to estimate a kind of the object worn on the hand by the target person. For example, in the case that the target person performs the work while changing the object such that the target person performs a certain work while wearing heat resistant gloves and such that the target person performs the next work while wearing chemical resistant glove, an accident caused by wrongly wearing the gloves can be prevented before the accident happens by monitoring whether the kind of the object is proper.

It is preferable that a color of the object that should be worn on the predetermined region varies according to the working environment or the working content, the proper state information includes information expressing the color of the object, and the controller is configured to determine whether the object presently worn by the target person is proper by evaluating color consistency. Whether the object is proper is determined by the color, which allows the high-accuracy determination to be performed through the simple processing.

It is preferable that a thickness of the object that should be worn on the predetermined region varies according to the working environment or the working content, the proper state information includes information expressing the thickness of the object, and the controller is configured to determine whether the object presently worn by the target person is proper by evaluating thickness consistency. Whether the object is proper is determined by the thickness, which allows the high-accuracy determination to be performed through the simple processing.

It is preferable that a shape of the object that should be worn on the predetermined region varies according to the working environment or the working content, the proper state information includes information expressing the shape of the object, and the controller may be configured to determine whether the object presently worn by the target person is proper by evaluating shape consistency. Whether the object is proper is determined by the shape, which allows the high-accuracy determination to be performed through the simple processing.

It is preferable that a wearing range of the object varies according to the working environment or the working content, the proper state information includes information expressing the wearing range of the object, and the controller is configured to determine whether a wearing state of the object worn by the target person is proper by evaluating consistency of the wearing range of the object. As used herein, the wearing range means a range of the predetermined region covered with the object. Therefore, not only whether the object is proper but also whether the wearing state of the object is proper can be monitored.

An embodiment of the invention can be understood as a monitoring device including at least a part of the above configurations and functions. An embodiment can also be understood as a monitoring method or a monitoring device control method that includes at least a part of the above pieces of processing, a program that causes the monitoring device (computer) to execute the method, and a computer-readable recording medium in which the program is non-transiently recorded. The embodiment can be constructed by a combination of the above configurations and pieces of processing as long as technical inconsistency is not generated.

According to the embodiment of the invention, whether the look of the worker is proper can be automatically monitored according to the working environment or the working content.

The invention claimed is:

1. A monitoring device configured to monitor whether a look of a target person is in a proper state suitable for a working environment or a working content, the monitoring device comprising:
   an image input unit configured to input an image of the target person;
   a detector configured to analyze the image input by the image input unit and detect a predetermined region of a human body of the target person;
   a state estimator configured to estimate a state of the predetermined region detected by the detector;
   a proper state acquisition unit configured to acquire proper state information, the proper state information expressing a proper state of the predetermined region according to the working environment or the working content; and
   a controller configured to determine whether a present state of the predetermined region of the target person is proper by comparing an estimation result of the state estimator to the proper state information, and perform control according to a determination result,
   wherein the proper state acquisition unit is configured to analyze the image input by the image input unit, estimate the working environment or the working content of the target person, and decide the proper state of the predetermined region based on the estimation result of the working environment or the working content of the target person.

2. The monitoring device according to claim 1, wherein the proper state acquisition unit is configured to read the proper state information from a storage in which the proper state information expressing the proper state of the predetermined region is previously set.

3. The monitoring device according to claim 2, wherein a plurality of pieces of proper state information can be set in the storage, and
   the proper state acquisition unit is configured to acquire the proper state information according to the working environment or the working content.

4. The monitoring device according to claim 3, wherein the monitoring device is configured to monitor a plurality of areas that differ from each other in the working environment or the working content, and
   the proper state acquisition unit is configured to acquire the proper state information based on which area the target person or the predetermined region is located in.

5. The monitoring device according to claim 1, wherein the proper state acquisition unit is configured to recognize a worn physical body except the predetermined region of the target person or a physical body existing around the target person from the image input by the image input unit, and estimate the working environment or the working content of the target person based on a recognition result.

6. The monitoring device according to claim 1, wherein the predetermined region is a hand, and
   the state estimator is configured to estimate whether the target person correctly wears an object on the hand of the target person, or estimate a kind of the object worn on the hand of the target person.

7. The monitoring device according to claim 1, wherein the predetermined region is a hand, and
   the state estimator is configured to estimate whether the target person correctly wears an object on the hand of the target person, or estimate a kind of the object worn on the hand of the target person.

8. The monitoring device according to claim 1, wherein an object is present in the predetermined region and a color of the object varies according to the working environment or the working content,
   the proper state information comprises information expressing the color of the object, and
   the controller is configured to determine whether the present state of the predetermined region of the target person is proper by evaluating color consistency.

9. The monitoring device according to claim 1, wherein an object is present in the predetermined region and the thickness of the object varies according to the working environment or the working content,
   the proper state information comprises information expressing a proper thickness of the object, and
   the controller is configured to determine whether the present state of the predetermined region of the target person is proper by evaluating consistency of the thickness of the object with the proper thickness.

10. The monitoring device according to claim 1, wherein an object is present in the predetermined region and the shape of the object varies according to the working environment or the working content,
    the proper state information comprises information expressing the shape of the object, and the controller is configured to determine whether the present state of the predetermined region of the target person is proper by evaluating shape consistency.

11. The monitoring device according to any one of claim 1, wherein an object is present in the predetermined region and the wearing range of the object varies according to the working environment or the working content, the proper state information comprises information expressing a proper wearing range of the object, and the controller is configured to determine whether the present state of the predetermined region of the target person is proper by evaluating consistency of the wearing range of the object with the proper wearing range.

12. A monitoring method for monitoring whether a look of a target person is in a proper state suitable for a working environment or a working content, the monitoring method comprising:

a step in which a computer inputs an image of the target person;

a step in which the computer analyzes the input image to detect a predetermined region of a human body of the target person;

a step in which the computer estimates a state of the predetermined region detected by the computer;

a step in which the computer acquires proper state information, the proper state information expressing a proper state of the predetermined region according to the working environment or the working content; and a step in which the computer determines whether a present state of the predetermined region of the target person is proper by comparing a result of the state estimation of the computer to the proper state information, and performs control according to a determination result, wherein the proper state information is acquired by the computer by analyzing the image input by the computer, estimating the working environment or the working content of the target person, and deciding the proper state of the predetermined region based on the estimation result of the working environment or the working content of the target person.

13. A non-transitory computer-readable recording medium in which a program configured to cause a computer to execute each step of the monitoring method according to claim 12 is stored.

* * * * *